Oct. 11, 1927.  
E. PURTZER  
1,645,401  
POWER TAKE-OFF SHAFT FOR AUTOMOBILE WHEELS  
Filed Feb. 14, 1927

Inventor  
Edward Purtzer,  
By Clarence A. O'Brien  
Attorney

Patented Oct. 11, 1927.

1,645,401

UNITED STATES PATENT OFFICE.

EDWARD PURTZER, OF LAMAR, INDIANA.

POWER-TAKE-OFF SHAFT FOR AUTOMOBILE WHEELS.

Application filed February 14, 1927. Serial No. 168,117.

This invention relates to new and useful improvements in power devices, and has for its primary object to provide means whereby power may be taken from one of the traction wheels of an automobile so as to permit of the operation of meat grinding machines, wheat fans, washing devices, etc. etc., the device being especially useful on farms or other unthickly populated districts.

In carrying out my invention I provide a short shaft having upon one end means to facilitate the attachment of the same to an automobile power wheel, and having at its opposite end a universal joint constructed to permit of the attachment of the control shaft of a washing machine, wheat fanning machine, or the like thereto.

In the drawing wherein like reference characters indicate corresponding parts throughout the several views.

Figure 1:
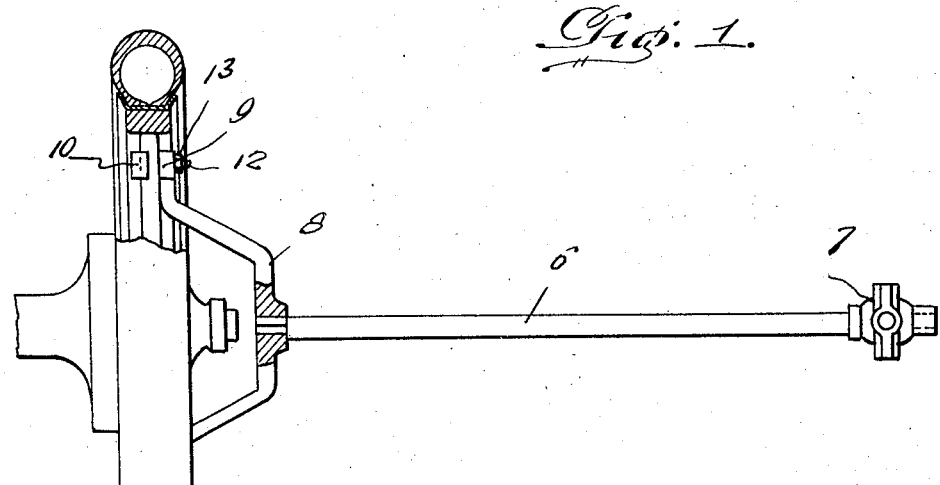
Figure 1 is a view partly in side elevation and partly in cross section of my improved power take off shaft actually attached to an automobile power wheel that is also disclosed partly in edge elevation and partly in section.
Figure 2:
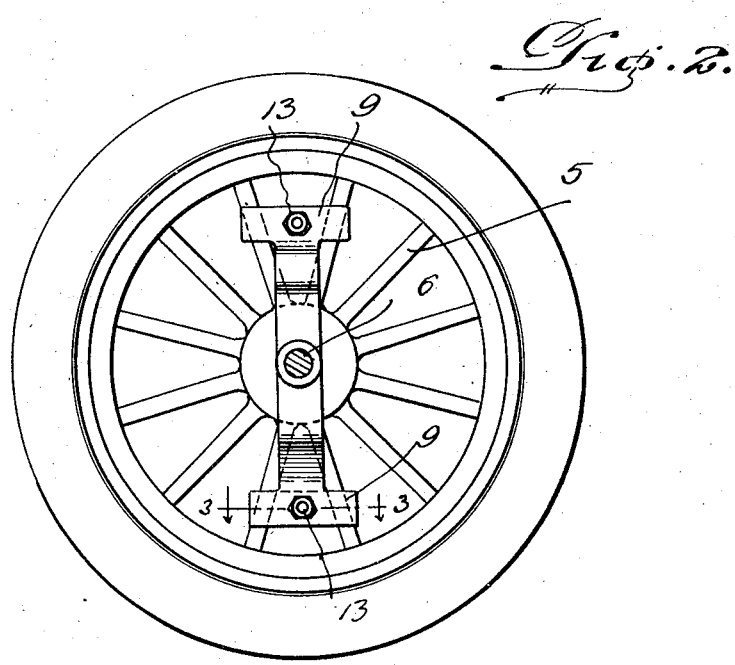
Figure 2 is an outer side elevation of the automobile wheel disclosing the inner end of the power take-off shaft as being secured thereto, the shaft per se being disclosed in section.
Figure 3:
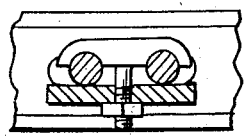
Figure 3 is a longitudinal section taken substantially upon the line 3—3 of Figure 1 for more clearly disclosing the manner of clamping the shaft to the wheel.

Now having particular reference to the drawing, 5 indicates a conventional spoked automobile power wheel to which the present device is constructed for attachment. Said device consists of a shaft 6 of predetermined length having upon one end a conventional universal joint 7 to the outer side of which may be attached the control shaft of a machine to be operated. Upon the inner end of this shaft 6 is a fork 8 of plate-like material, the fingers of which are in outwardly converging relation, and of a length to permit the ends thereof to engage the spokes of the wheel without the center of the fork coming in contact with the automobile wheel hub as in Figure 1. The extreme inner ends of the fork fingers are formed with lateral T-shaped extensions 9—9 for engagement with pairs of spokes at opposed sides of the wheel hub, the ends thereof overlapping the spokes as clearly disclosed in Figure 2. For rigidly securing the T-shaped extensions of the fork 8 to the pairs of spokes there is arranged in back of each pair, a clamp 10 formed at its inner face and adjacent its opposite ends with rounded notches 11—11 for receiving the spokes as in Figure 3. Each clamp 10 is formed centrally with an outwardly extending threaded bolt 12 for engagement through the opening in the respective T-shaped extensions 9—9 of the fork after which they are tightly bound upon the pairs of spokes by nuts 13—13 threaded upon said bolts.

Obviously when the rear end of the automobile is jacked up and the particular wheel to which the shaft is attached is rotated, power may be applied to other machinery for operatively connecting the same to the universal joint 7 of the present invention.

Having thus described the invention, what I claim as new is:—

In a power take-off for vehicle tire wheels, a length of shafting, a fork fixed to one end of the shaft and terminating in outwardly directed ends alined with each other, lateral extensions upon the free ends of the fork terminals for engaging opposed pairs of spokes of the vehicle wheel, clamps having stud bolts projecting therefrom through openings in the centers of the terminals of the fork, and nuts threaded on the bolts, the ends of the clamps being notched to receive the spokes and prevent turning of the clamps when the nuts are tightened so as to secure the spokes between the clamps and the lateral extensions.

In testimony whereof I affix my signature.

EDWARD PURTZER.